July 19, 1955

E. J. WEST ET AL 2,713,458

SPEED-AVERAGING DEVICE

Filed July 14, 1952

INVENTORS
Everett J. West
William A. Black
BY
Richard E. Burn
ATT'Y.

July 19, 1955  E. J. WEST ET AL  2,713,458
SPEED-AVERAGING DEVICE
Filed July 14, 1952  5 Sheets-Sheet 2

INVENTORS
*Everett J. West*
*William A. Black*
BY *Richard E. Burn*
Attorney

July 19, 1955

E. J. WEST ET AL 2,713,458

SPEED-AVERAGING DEVICE

Filed July 14, 1952

INVENTORS
Everett J. West
William A. Black
BY
Richard E. Burn
ATT'Y.

July 19, 1955  E. J. WEST ET AL  2,713,458
SPEED-AVERAGING DEVICE
Filed July 14, 1952  5 Sheets-Sheet 5

Fig. 11

INVENTORS
*Everett J. West*
*William A. Black*
BY
*Richard E. Burr*
ATT'Y.

United States Patent Office 2,713,458
Patented July 19, 1955

2,713,458

SPEED-AVERAGING DEVICE

Everett J. West, Huntington, N. Y., and William A. Black, Montclair, N. J., assignors to General Time Corporation, New York, N. Y., a corporation of Delaware Application July 14, 1952, Serial No. 298,872

11 Claims. (Cl. 235—61)

This invention relates to an averaging device and, more particularly, to a speed-averaging device for indicating at any predetermined instant the average speed at which a moving vehicle has been maintained.

Prior devices of a similar nature utilizing a cam controlled differential mechanism often give incorrect indications of average speed because it is impossible to utilize cam elements of a logarithmic configuration which are accurate in the portion thereof representative of small values due to the inherent large size of the accurate cam members. Another common source of inconvenience in indicating average speed during a series of short time increments arises from the fact that it is impossible to quickly and simultaneously reset these prior indicating devices to an initial starting position upon completion of a desired increment of travel. However, in those prior devices which do provide some means of returning the indicator to an initial position, no provision is made to insure the continued operation of the timing means with the result that renewed use of the average speed indicator after resetting often yields incorrect results.

Accordingly, one object of this invention is to provide a new and improved average speed indicator utilizing a signalling means to denote both the establishment and cessation of an accurate indicating period whereby small logarithmic cams can be used to produce an accurate average speed indicator which is both small and compact.

Another object of this invention resides in the provision of an average speed indicator wherein it is possible to easily and quickly reset the indicator for subsequent determination of average speed over a different course of travel.

A further object is to provide an average speed indicator in which the timing means of the indicator is automatically conditioned for a new cycle of operation each time the indicator is reset for a subsequent series of average speed determinations.

Further objects and advantages of the present invention will become apparent as the following description proceeds and the features of novelty which characterize the invention will be pointed out with particularity in the claims annexed to and forming a part of this specification.

In accordance with these and other objects, one embodiment of this invention comprises a pair of cylinders, each of said cylinders having a spiral logarithmic cam track cut therein, the cam tracks on the two cylinders being arranged in opposite directions. One of the cylinders is rotated by a gear train in proportion to the distance traveled by the vehicle whose average speed is to be determined while the other cylinder is rotated at a constant speed by a clock spring geared thereto and controlled by a clock movement which is geared to the second cylinder. A pair of cam followers engaging the cam tracks are moved in opposite directions relative to each other by quantities that are respectively proportioned to the logarithms of the time elapsed and the distance traveled so that a differential control mechanism is displaced from a normal position in accordance with the difference in the movements of the cam followers. The displacement of the control mechanism is subsequently translated into linear motion of an arm relative to a fixed linear scale calibrated in units of speed so that a direct determination of average speed may be made by an observer. A differential gear train which is operatively connected to both of the cylinders may be manually driven to return both of the cam followers to their original positions and, simultaneously therewith, to wind the clock spring driving the timing cylinder. An auxiliary indicator controlled by the two cam followers is also provided to denote the completion of a predetermined amount of movement by each of the cam followers, which movement is representative of the inaccurate portion of the cam tracks.

For a better understanding of the present invention reference may be had to the accompanying drawings in which:

Fig. 7 is a fragmentary section view taken along line 7—7 in Fig. 3, assuming Fig. 3 shows the complete structure, showing a differential control mechanism for the averaging unit;

Referring now to the drawings wherein like numbers designate the same elements throughout the several views, and more particularly to Figs. 1, 2, 3, 5 and 11, there is illustrated the trip averaging unit 19 of the present invention which comprises a frame 20 secured to and positioned within an open casing 22 by a plurality of machine screws 24 which engage a plurality of apertured rods upon which a plurality of spacer sleeves 26 are positioned. Rotatably journalled within the casing 22 are a pair of cylinders 23 and 25 each provided with a spiral cam track, more fully described hereinafter. The cylinder 23 is the distance cylinder while the cylinder 25 is the time cylinder. The open end of the casing 22 is closed by a transparent cover 27 supported by a bezel 28.

Figure 11:
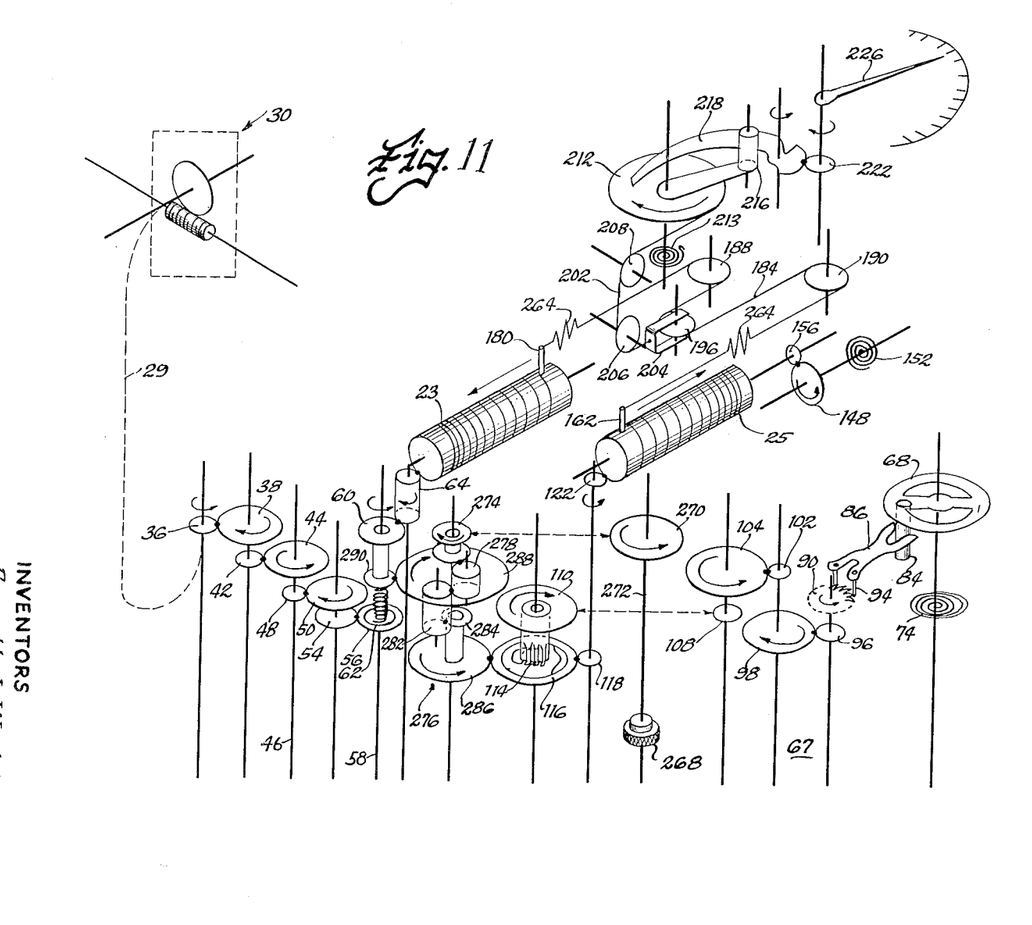
Fig. 11 is a schematic diagram of some of the mechanism included in the speed averaging unit.

For the purpose of rotating the distance cylinder 23 in proportion to a distance quantity, the speed averaging unit of the present invention is provided with information directly proportional to distance traveled. Thus, in the case of an automobile or other vehicle, a flexible cable 29 is provided which may be geared to an external speedometer unit indicated generally at 30 (Fig. 11). The flexible cable 29 is received within a hollow shaft 32 (Fig. 5) which is rotatably journaled in the frame member 20. An externally threaded coupling member 34 (Fig. 2) is provided on the casing 22 to receive an internally threaded coupling nut (not shown) for rigidly securing the coupling structure to the casing 22 with the cable 29 held in position within the hollow shaft 32. A gear member 36 is received at one end within the hollow shaft 32 and is rotatably mounted at its upper end within the frame 20 so that rotational motion imparted to the shaft 32 is applied to the gear 36 and subsequently coupled to a pair of gears 38 and 42 secured to a shaft 40 which is rotatably mounted in the frame 20.

Gear 42 transmits the rotary motion received by gear 38 to a gear 44 which is secured to a shaft 46 rotatably mounted in the frame 20. A gear 48 rigidly secured to the shaft 46 engages a gear 50 which is secured to a shaft 52 rotatably mounted in the frame 20. A gear 54 also secured to the shaft 52 engages a gear 56 which is in turn secured to a shaft 58. The gear 56 is coupled to a gear member 290 rotatable on the shaft 58 by means of a friction clutch which includes a resilient member 62 interposed between these two gears. The friction clutch allows the distance cam 23 to be turned for resetting without moving gear 56 and the gear train coupled thereto. Gear 290 is integral with a gear 60 which engages the teeth of a gear 64 that is secured to a shaft 66 rotatably mounted in the frame 20. The gear 64 drivingly engages the gear teeth formed on one end of the distance cylinder 23 whereby through the above described gear train, the distance cylinder 23 is driven from a device such as cable 29.

For the purpose of rotating time cylinder 25 of the trip averaging unit 19 in a manner directly proportional to time so as to provide a linear time base, there is included in the unit 19 a timing mechanism of conventional construction generally indicated at 67. Briefly, this timing mechanism 67 comprises a balance wheel 68 which is rigidly secured to a shaft 70, each end of which shaft 70 is rotatably mounted in a pair of bearing cups contained within the shanks of a pair of adjusting screws 72. A balance wheel spring 74 is secured at one end to the shaft 70 and at the other end to a post 76 projecting upwardly from the frame member 20. A right angle arm 78 having an inclined slot 80 therein through which the outer convolution of the spring 74 is threaded is movably positioned on the frame 20 by means of one of the adjusting screws 72 and a regulator washer 82. Adjustment of the right angle arm 78 relative to the frame 20 varies the effective length of the spring 74 and accordingly varies the periodicity of the oscillating movement of the balance wheel 68. A pin 84 depending from the balance wheel 68 is intermittently engaged between the bifurcations of a time lever 86 which is rigidly secured to a shaft 88 rotatably mounted in the frame 20. The alternations or oscillations of the balance wheel 68 about its axis are transmitted through the lever 86 to a time escape wheel 90 by means of a pair of pins 94 depending from another bifurcated end of the time lever 86. The time escape wheel 90 and a cage gear 96 are secured to the shaft 92 with the gear 96 engaging a gear 98 secured to a shaft 100 which is rotatably mounted in the frame 20. Another cage gear 102 secured to the shaft 100 transmits the rotary motion produced by the time escape wheel 90 to a gear 104 which is rigidly secured to a shaft 106 rotatably mounted in the frame 20. A cage gear 108 secured to the shaft 106 engages a gear 110 which is rotatably mounted on a shaft 112. Another gear 114 is integral with the gear 110 and extends into engagement with a one-way ratchet gear 116. The ratchet gear 116 is so disposed with relation to the gears 110 and 114 that only clockwise rotation of the gear 110 is transmitted through the gear 116 to a gear 118 secured to a shaft 120. A gear 122 is also secured to the shaft 120 which is rotatably mounted in the frame 20. This gear 122 drivingly engages gear teeth 25a formed on one end of the time cylinder 25.

To provide motive power for the timing mechanism 67 there is provided a main spring assembly indicated generally as 134 in Figs. 3, 4, 8 and 9. The assembly 134 includes an arcuate shaped housing member 136 which is secured to a bracket 138, which bracket is mounted on the frame 20 by the machine bolts 24. A journal bearing 140 (Fig. 4) extends through the bracket 138 and housing 136 and receives a shaft 142 to which a spur gear 148 having a depending cylindrical sleeve 150 is attached. A flat convolute spring 152 is secured at one end to the cylindrical sleeve member 150 and is secured at its other end to the housing 136. The upper end of the shaft 142 is journalled in a bracket 154 so that the gear 148 and shaft 142 are free to rotate under the influence of the spring 152. The gear 148 engages a pinion gear 156 which is secured to the shaft supporting the cylinder 25 so that after the spring 152 has been wound, the gear 148 tends to rotate the cylinder 25 in a clockwise direction, as viewed in Fig. 11, at a constant speed controlled by the clock mechanism 67.

Since average speed is the ratio of the distance traveled to the elapsed time, the following equation for average speed may be employed:

Log distance—log time=log average speed

To produce this mechanically, each of the cylinders 23 and 25 is provided with a logarithmic cam track whereby the subtraction of two logarithmic quantities in accordance with the above mentioned equation can readily be carried out. Specifically, distance cylinder 23 is provided with a logarithmic cam track 132 which, as viewed in Fig. 7 of the drawings, begins at the lower end of cylinder 23 and spirals progressively upward to a stop, not shown, at the upper end of this cylinder. Similarly, a logarithmic cam track 158 is cut in the surface of the time cylinder 25 and progresses spirally downward from an uppermost point adjacent a stop member 160 (Fig. 9) to a lowermost position adjacent the gear 156.

Although the cam tracks 132 and 158 which are cut in the surfaces of the cylinders 23 and 25, respectively, are substantially pure logarithmic spirals, it is difficult to cut a logarithmic spiral cam track for low values of the logarithmic quantity without making the length of the cylinders 23 and 25 of inordinate size so as to be incapable of being incorporated in an instrument of practical size which could be mounted in the dashboard of an automobile, for example. Accordingly, a portion of the first and the last convolution on both the distance and time cylinders 23 and 25, respectively, deviates from a pure logarithmic spiral. However, the remaining portions of the cam tracks 132 and 158 represent a pure logarithmic spiral.

For the purpose of producing a logarithmic quantity in dependence upon rotation of the time cylinder 25, the cam track 158 is engaged by a spring loaded cam track follower arm 162 (Figs. 7 and 9) which is carried by a movable carriage indicated generally as 164. The frame or carriage 164 includes a U-shaped member 166 having a plurality of notched portions in both sides of the upstanding legs thereof, which notched portions engage a pair of vertically extending rods 168 mounted in the frame 20. The carriage 164 is vertically reciprocal along the rods 168. A plate 170 is spaced above and secured to the U-shaped member 166. The cam follower arm 162 passes through apertures in the plate 170 and the U-shaped member 166 and is held in an adjusted position therein in contact with the cam track 158 by means of a coiled compression spring 176 which is interposed between the plate 170 and a flanged washer 178 (Fig. 9) secured to the follower arm 162.

To also produce a logarithmic quantity in dependence upon the rotation of the distance cylinder 23, a cam follower arm 180 is mounted in a carriage identified as 182 which is identical to the carriage 164 just described, and is movable on a pair of rods 183 with the follower arm 180 in engagement with the cam track 132.

Figure 9:
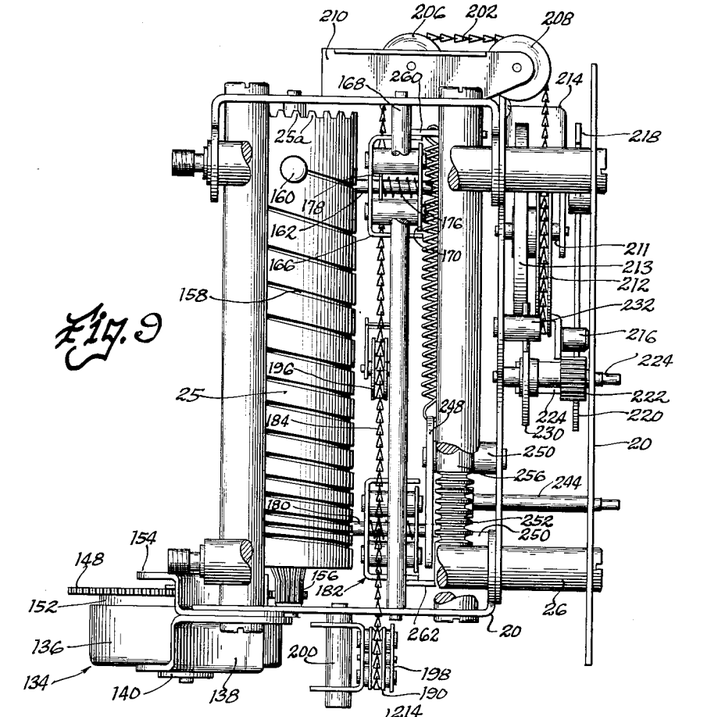
Fig. 9 is a fragmentary side elevational view of the differential control mechanism and an indicating device therefor.

In order to subtract the logarithm of time from the logarithm of distance in accordance with the equation set forth above, the two cam follower carriages 164 and 182 are joined together by a flexible chain 184 (Figs. 7, 8 and 11), one end of which is secured to each of the carriages 164 and 182. The flexible chain 184 passes through a pair of openings 186 and 187 in the frame 20 and around a pair of pulleys 188 and 190 and thence through a pair of apertures 192 and 194 in the frame 20 and around a pulley 196. The pulleys 188 and 190 are rotatably mounted on a single pulley block 198 which is secured to the lower surface of the frame 20 by a pair of rods 200 (Fig. 9).

Figure 7:
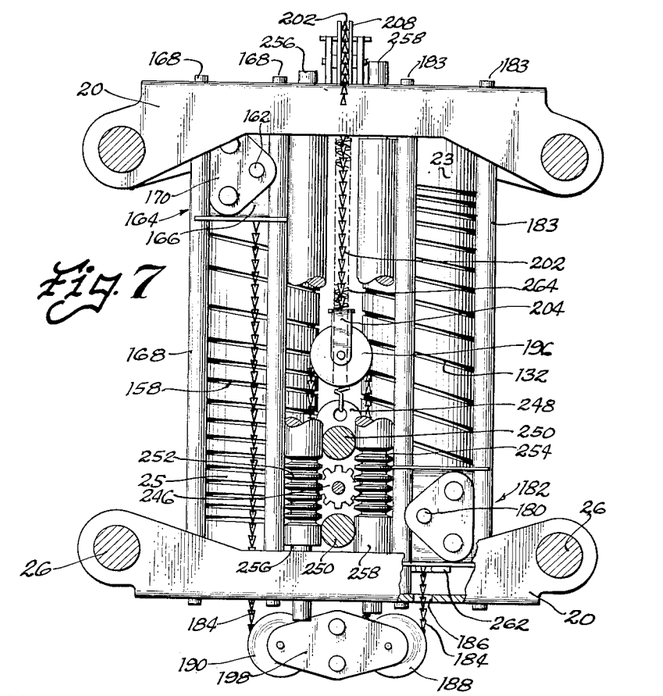
Figure 8:
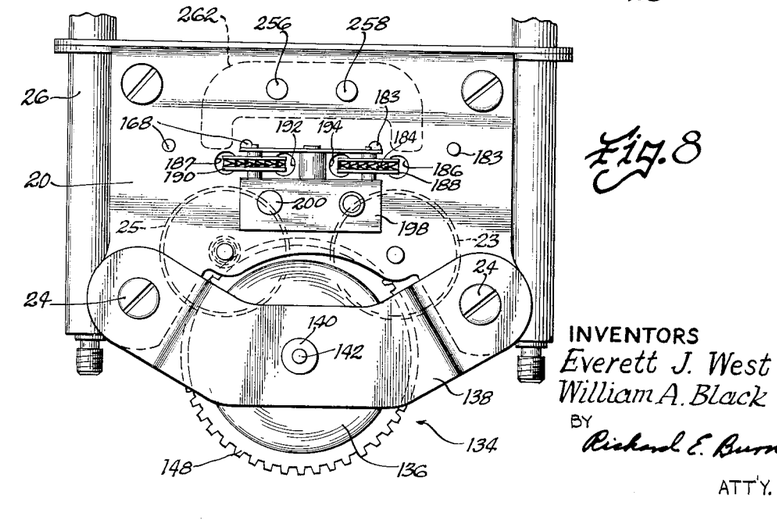
Fig. 8 is an enlarged fragmentary view of the bottom of the differential control mechanism shown in Fig. 7.

As shown in Fig. 7, the pulley 196 is in a normal position in which neither of the follower arm carriages 164 and 182 have been moved. However, upon subsequent rotation of the cylinders 23 and 25, the cam follower arms 162 and 180 will be advanced by the cam tracks with which they are in engagement. Rotation of the time cylinder 25 advances the follower arm 162 and, consequently, the carriage 164 in motion of translation in a downward direction, as viewed in Fig. 7, while rotation of the distance cylinder 23 advances the follower arm 180 and, accordingly, the carriage 182 in motion of translation in an upward direction. As explained above, the rotation of these cylinders is directly proportional to time elapsed and the distance traveled so that the provision of the logarithmic spirals on the outer surface of the cylinders 23 and 25 converts the directly proportional movement of rotation of the cylinders to a translatory movement of the follower arms which is representative of the linear rotary movement of the cylinders. Since the quantity of the movement of the carriages is proportional to the logarithms of the distance traveled and time elapsed, and, since the directions of movement are opposed, the pulley 196 is moved a distance which is directly proportional to the logarithmic difference between the movements of the two cam follower arms and, accordingly, is equivalent to the logarithmic value of the quotient of distance traveled divided by time elapsed.

Figure 10:
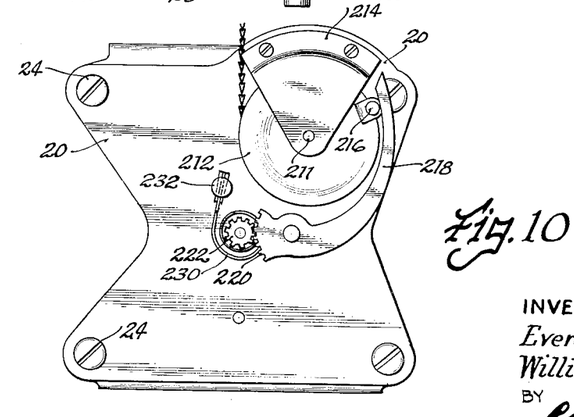
Fig. 10 is a plan view of an actuating means for the indicating device.

For the purpose of producing an indication of this logarithmic difference which is detected by the variations in positions of the pulley 196, there is provided an apparatus including a spring tensioned flexible chain 202 (Figs. 7 and 11) which is secured at one end to a pulley block 204 in which the pulley 196 is rotatably mounted. The chain 202 passes over a pair of pulleys 206 and 208 (Figs. 3 and 9) which are rotatably mounted in a pulley block 210 secured to the frame 20. The chain 202 then passes about a portion of the periphery of a grooved pulley 212 (Figs. 9, 10 and 11) which is pivotally mounted on the frame 20 by means of a bracket 214 and a shaft 211. The free end of the chain 202 is secured to the pulley 212 and this pulley is spring loaded to exert a continuous slight tension on the chain 202 by means of a convolute flat spring 213 which is secured at one end to the shaft 211 and at its other end to the bracket 214.

Figures 1, 2, 3:
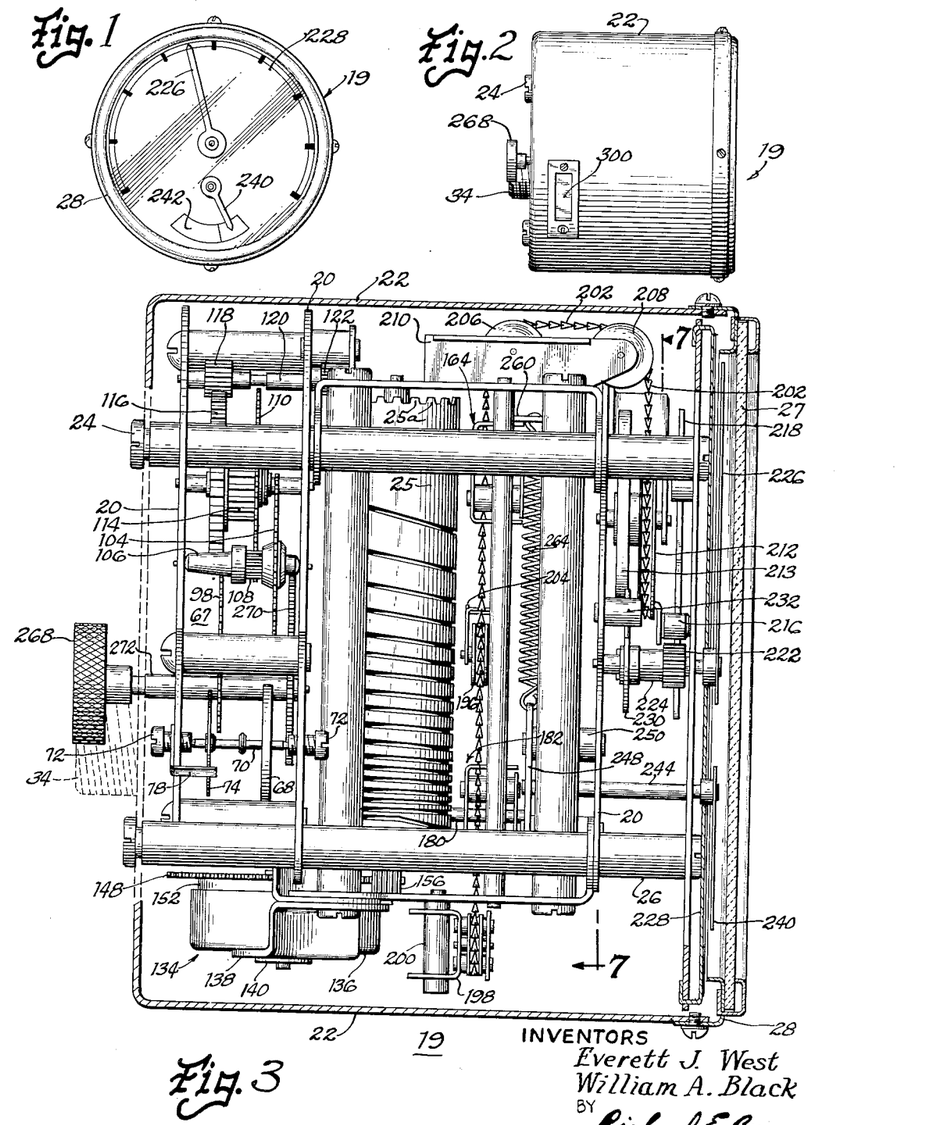
Fig. 1 is a front elevational view of a speed averaging unit embodying the invention.
Fig. 2 is a side elevational view of the unit shown in Fig. 1.
Fig. 3 is an enlarged side elevational view of the unit shown in Fig. 2 with the casing cut away.
Figure 4:
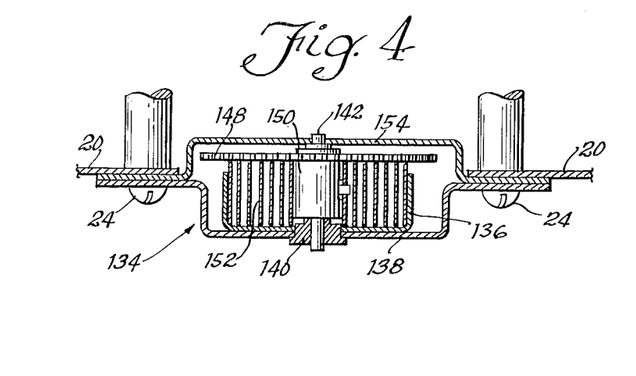
Fig. 4 is an enlarged fragmentary sectional view of a main spring assembly for actuating a portion of the mechanism in the averaging unit.
Figure 5:
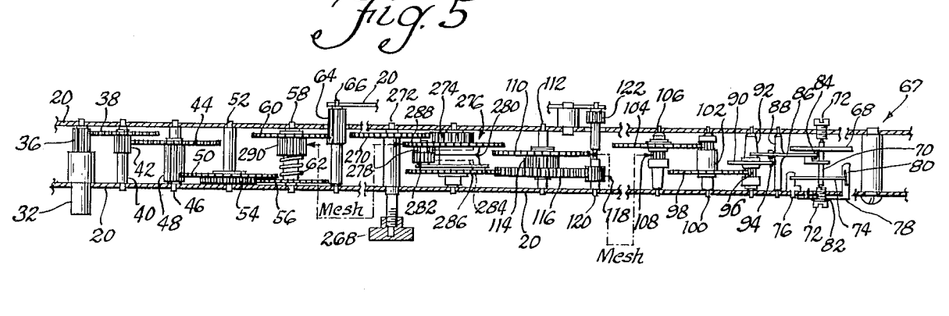
Fig. 5 is a schematic showing of a gear train for actuating the speed averaging unit.

Any suitable means for converting the logarithmic difference which comprises the logarithm of average speed to the actual quantity of average speed may be employed. As illustrated, an anti-logarithmic cam is employed. Specifically, a roller 216 is secured to the pulley 212 adjacent the outer periphery thereof to engage a cam 218 having a substantially anti-logarithmic characteristic. This cam is pivotally mounted to the frame 20 and is provided with a series of gear teeth 220 at one end thereof which are in engagement with a spur gear 222. The gear 222 is secured to a shaft 224 which is rotatably mounted in the frame 20 and extends outwardly from this frame into an open section between the frame and the transparent cover 27 (Fig. 3). An indicator arm 226 is secured to the shaft 224 at one end thereof and cooperates with the linearly spaced indicia on a scale plate 228 (Figs. 1 and 3) to indicate average speed. A flat convolute spring 230 is secured at one end to the shaft 224 and at the other end to a post 232 which is mounted on the frame 20. This spring serves to oppose a turning movement of the shaft 224 under the influence of the cam 218 and gear 222 and, accordingly, hold the cam 218 in contact with the roller 216. It will be understood that the anti-logarithmic cam 218 could be omitted and a logarithmic scale employed instead. However, it is believed that a linear scale, as illustrated, is preferable.

In accordance with the present invention and to indicate when the cam followers 162 and 180 are engaged in the inaccurate portions of the cam tracks 158 and 132, respectively, a signalling device including an indicator arm 240 (Figs. 1 and 3) and a two sector scale 242 is provided. The indicator arm 240 is actuated by a shaft 244 (Figs. 7 and 9) which is rotatably mounted in the frame 20 at one end and the other end of the shaft 244 is journalled within a plate 248 which is secured to the frame 20 by spaced rods 250. A gear 246 is secured to the shaft 244 and is engaged by a series of teeth 252 and 254 formed in a pair of rods 256 and 258, respectively. The upper end of the rod 256 is secured to a bracket 260 (Figs. 3 and 9) which is identical in configuration with a bracket 262 secured to the lower end of the rod 258. The rod 258 is slidable in an aperture in the bracket 260, and the rod 256 is slidable in an aperture in the bracket 262. The rods 256 and 258 are slidably mounted in the frame 20 for vertical movement, the extent of which is limited by the engagement of a shoulder on the rods with the apertures in the brackets 260 and 262 in which the rods are slidably mounted. A pair of depending portions on the bracket 262 (Figs. 8 and 9) project between the pair of rods 168 and 183 to engage the under side of the follower arm carriages 182 and 164, and similar depending portions of the bracket 260 engages an upper surface of the follower arm carriages 182 and 164 (Figs. 3 and 9).

A spring member 264 is engaged at one end by the plate 248 and is engaged at the other end within an aperture in the bracket 260 so that the bracket 260 tends to move downwardly through whatever distance the carriage 164 moves under the control of the time cylinder 25. Any movement of the bracket 260 in a downward direction as viewed in Figs. 3 and 9, moves the rod 256 downwardly and rotates the gear 246. However, if the distance cylinder 23 has not been rotated to permit an upward movement of the follower arm carriage 182 and, consequently, of the bracket 262, the gear 246 is held against rotation by the engagement of the teeth of the gear 246 with the teeth 254 formed in the rod 258. Moreover, when each of the cylinders 23 and 25 have been displaced sufficiently so that the followers 180 and 162 are on the true logarithmic spiral portion of the cam tracks, then the carriages 164 and 182 are moved sufficiently so that both rods 256 and 258 are moved in opposite directions to rotate the gear 246 and accordingly the shaft 244. This predetermined rotation of the shaft 244 moves the indicator arm 240 from the left-hand sector of the calibrated scale 242, as viewed in Fig. 1, to the right-hand sector of this calibrated scale to indicate that both cylinders 23 and 25 have rotated far enough so that the cam followers are now in the true and accurate portion of the spiral logarithmic cam tracks formed thereon.

The arm 240 always remains in the left-hand sector of the scale 242 until both rods 256 and 258 are allowed to move the predetermined distance representative of the completion of the required rotation by both of the cylinders 23 and 25. It is not possible for either one of the brackets 260 or 262 and its associated control rod 256 or 258 to move the full extent of its limited vertical movement as viewed in Fig. 7 of the drawings without an identical movement of the other bracket and rod.

This signalling device comprising pointer or arm 240 also indicates the presence of incorrect dial readings which are due to either one of the cam follower arms 162 or 180 reaching the end of the cam track with which they are associated. As either one of the arms 162 or 180 reach the end of their respective cam track, the carriage 164 or 182 associated therewith engages the bracket 260 or 262, respectively, which is normally controlled by the other of the two carriages and moves this bracket so that the gear 246 is rotated in a clockwise direction to return the indicator arm 240 to the left-hand sector of the scale 242. For instance, if the cam follower arm 180 carried by carriage 182 reaches the uppermost extremity of the cam track 132 formed in the distance cylinder 23 before the follower arm 162 reaches the lower extremity of the cam track 158 formed in the time cylinder 25, the carriage 182 engages and moves vertically upward, as viewed in Fig. 9, the bracket 260 normally controlled by the carriage 164. As the bracket 260 is raised, the rod 256 secured thereto is also moved vertically upward to rotate the gear 246 in a clockwise direction to return the indicator arm 240 to the left-hand sector, as viewed in Fig. 1, of the scale 242 and thereby indicates that the readings of average speed are incorrect. Obviously, a similar result would be obtained if carriage 164 engaged the bracket 262.

Figure 6:
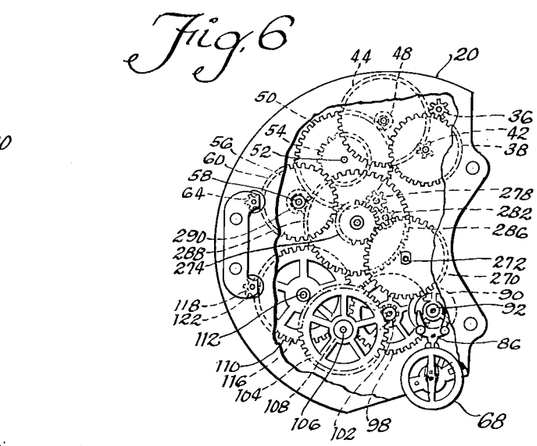
Fig. 6 is a plan view of the gear train shown schematically in Fig. 5.

The present invention includes a simple and compact arrangement for restoring the cylinders 23 and 25 to their original positions. To this end there is provided a knob 268 (Figs. 5, 6 and 11) which is rotated in a clockwise direction, as viewed in Fig. 11, to rotate a gear 270 which is secured to a shaft 272. The shaft 272 is rotatably mounted in the frame 20 and extends beyond the frame 20 and casing 22 to engage the knob 268. Clockwise rotation of the gear 270, as viewed in Fig. 11, rotates a gear 274 which is part of a differential gear unit indicated generally at 276. The gear 274 is rotatably mounted on the frame 20 and engages a gear 278 which is rotatably mounted between two upstanding walls on a U-shaped or flanged member 280. The gear 278 engages a gear 282 which is also rotatably mounted between the two walls of the flanged member 280, and the gear 282 is in engagement with a gear 284 which is integral with a gear 286. Gears 284 and 286 are rotatably mounted in the frame 20. The upper wall of the member 280 is provided with teeth to form a gear member 288 which engages a gear 290 which is integral with the gear 60 so that rotation of the gear 288 rotates the gear 60 in a clockwise direction, as viewed in Fig. 11. The clockwise rotation of the gears 60 and 290 is subsequently transmitted to the cylinder 23 to rotate this cylinder in a direction opposite to that in which it is normally rotated and accordingly returns the cam follower 180 and carriage 182 to an original position with the follower arm 180 adjacent the lower portion of the frame 20, as viewed in Fig. 7. The clockwise rotation of the gears 60 and 290 is not transmitted through the gear 56 and the following gear train to the flexible cable 29 because of the provision of the friction clutch including the spring member 62 which permits slippage at this point.

Simultaneously with the clockwise rotation of the gears 60 and 290, the gear member 286 rotates the gear 116 in a counterclockwise direction to return the cam follower 162 to an original position adjacent the upper surface of the frame 20. This counterclockwise rotation of the gear 116 is not transmitted to the clock or timing mechanism 67 because of the interposition of the one-way ratchet 114 which only transmits clockwise rotating motion between the gears 116 and 110, as viewed in Fig. 11. In accordance with the present invention, rotation of the cylinder 25 which returns the cam follower arm 162 to the original position also winds the main spring 152 inasmuch as the gear 148 is in direct engagement with the gear 156 formed on the cylinder 25.

In view of the foregoing detailed description of the speed averaging unit, it is now believed that the general operation of the unit will be easily understood. In operation, the flexible coupling element 29 (Fig. 11) is securely positioned within the hollow shaft 32 by attaching a coupling nut to the external coupling housing 34 on the exterior of the casing 22. The operator then rotates knob 268 in a clockwise direction to insure that both cylinders 23 and 25 are in their normal starting positions. The operator then manually actuates the balance wheel 68 if this wheel did not begin oscillation upon rotation of the knob 268. A suitable window 300 in the casing 22 permits viewing of this balance wheel, and preferably a starter lever, not shown, is provided outside the casing 22 to initiate oscillation of the balance wheel. As soon as the vehicle to which the unit has been attached is driven, the gear train including the gears 36, 38, 42, 44, 48, 50, 54, 56, 60, 64 and teeth 23a rotate the distance cylinder 23 so that the follower arm 180 begins to move vertically upward, as viewed in Fig. 7 of the drawings. The carriage 182 also is moved upward thereby and permits the bracket 262 to move in an upward direction if the corresponding bracket 260 controlled by the time carriage 164 has been permitted to move in a downward direction a distance representative of substantially two-fifths of one revolution of the time cylinder 25.

The alternations of the balance wheel 68 are converted to rotary motion by the time mechanism 67 including the time lever 86, time escape wheel 90, etc., and this rotary motion is coupled to the time cylinder 25 by a gear train including the gears 96, 98, 102, 104, 108, 110, 116, 118, 122 and teeth 25a. Rotation of the cylinder 25 moves the follower arm 162 vertically downward, as viewed in Fig. 7 of the drawings, at a logarithmic rate and accordingly moves the frame 164 in a downward direction. At such time as the frame 182 moves upwardly and the frame 164 moves downwardly a distance representative of two-fifths of one revolution of each of the cylinders 23 and 25, the teeth 252 and 254 have rotated the gear 246 to move the indicator arm 240 to the right-hand sector of the calibrated scale 242 as viewed in Fig. 1, thereby indicating that the accurate portion of the cam tracks are now in engagement with the cam followers 162 and 180.

If the two carriages 164 and 182 are moved in their opposite directions at exactly the same rate, the chain 184 merely passes over the plurality of pulleys 188, 190 and 196 and does not effect a change of position in the pulley 196 with the consequent result that the indicator needle remains at its initial setting. However, if either one of the carriages 164 or 182 advances along the cylinder associated therewith at a more rapid rate than the other, the position of the pulley 196 is varied in a vertical direction. The variations in position of the pulley 196 are transmitted through the chain 202 to the pulley 212 so that the position of contact between the cam 218 and the roller assembly 216 is varied. The variation in the point of contact between the roller assembly 216 and the cam 218 rotates this cam about its axis, and this rotation is transmitted through the gear teeth 220 and the gear 222 to vary the position of the indicator arm 226 with respect to the indicia on the scale 228.

When it is desired to re-set the indicator 226 and the cylinders 23 and 25 to their original position, the knob 268 is rotated in a clockwise direction, as viewed in Fig. 11. This clockwise rotation of the knob 268 and gear 270 is subsequently transmitted to the cylinder 23 through a gear train including gears 274, 278, 288, 290, 60, 64 and gear teeth 23a. This rotation of the cylinder 23 is opposite in direction to that produced by the coupling element 29 and accordingly returns the cam follower arm 180 to an original position adjacent the lower extremity of the fame 20, as viewed in Fig. 7. The return of the cam follower arm 180 and the carriage 182 to the original position also returns the bracket 262 to a position adjacent the lower extremity of the frame 20. In this position the rod 258 is moved downwardly to rotate the gear 246 so that the indicator arm 240 is returned to the left-hand sector of the calibrated scale 242 as an indication that at least one of the cam tracks 132 and 158 are not engaged by their respective cam follower arms in an accurate portion of the cam track.

Rotation of knob 268 also actuates a gear train including gears 270, 274, 278, 282, 286, 116, 118, 122 which rotates the cylinder 25 in a direction opposite to that provided by the main spring assembly 134 and clock movement. This rotation of the cylinder 25 moves the cam follower arm 162 and the follower arm carriage 164 vertically upward to their original position. This rotation of the time cylinder 25 is also transmitted through the gears 156 and 148 to wind up the main spring 152. Accordingly, rotation of the single knob 268 conditions the entire speed averaging unit for a subsequent cycle of operation and positively insures that the source of actuation for the timing means including the time cylinder 25 is conditioned for a future cycle of operation.

It is to be understood that the above-described embodiments of the invention are merely illustrative of the principles thereof and that numerous other changes and modifications may be devised by those skilled in the art, and it is intended in the appended claims to cover all such changes and modifications which fall within the true spirit and scope of this invention.

What is claimed as new and desired to be secured by Letters Patent of the United States is:

1. An averaging device comprising means for producing translatory movement representative of the logarithmic value of a constant rate, means for producing translatory movement representative of the logarithmic value of a variable rate, a first means controlled by both of said movement producing means for indicating the difference in movement produced by both of said means, and a second means controlled by both of said movement producing means for indicating the occurrence of a predetermined minimum movement by each of said producing means.

2. A speed averaging device comprising means for producing translatory movement representative of the logarithmic value of elapsed time, means for producing translatory movement representative of the logarithmic value of distance traveled, means controlled by both of said movement producing means for indicating the average rate of travel, and additional means controlled by both of said movement producing means and operated to indicating position only after a predetermined minimum time interval has elapsed and a predetermined minimum distance has been traveled.

3. An averaging device comprising a first control element, a second control element, means for displacing the first control element in accordance with the logarithmic variations of a first condition, means for displacing the second element in accordance with the logarithmic variation of a second condition, a first means controlled by both of the elements for indicating the difference in displacement as a representation of the value of the quotient of said two conditions, and a second means controlled by both of said elements for indicating a predetermined displacement of each of said elements.

4. An averaging device comprising a first control element, a second control element, means for displacing the first control element in response to the logarithmic variation of a first condition, means for displacing the second control element in response to the logarithmic variation of a second condition, a first means controlled by both of said elements for indicating the difference in displacement therebetween, a second means controlled by both of said elements for indicating a predetermined displacement of each of said elements, and means for simultaneously returning both elements to their positions prior to displacement.

5. An averaging device comprising a source of constant speed rotary motion, means actuated by said constant speed source for producing translatory movement that is logarithmically representative of said rotary motion, means for producing translatory movement that is logarithmically representative of a variable condition, a first means controlled by both of said translatory motion producing means for indicating the difference in translatory movement produced thereby, and a second means for indicating the production of a predetermined amount of translatory movement by each of said motion producing means.

6. An averaging device comprising a constant speed source of rotative motion, means actuated by said constant speed source for converting said motion into a first logarithmic translatory movement, a variable speed source of rotative motion, means actuated by said variable speed source for converting said variable speed rotative motion into a second logarithmic translatory movement, differential means controlled by said first and second logarithmic movements for indicating the difference therebetween, and differential gear means in engagement with both of said converting means for returning said converting means to a normal position before production of said translatory movement.

7. A speed averaging device comprising means for producing movement representative of the logarithmic value of elapsed time, means for producing movement representative of the logarithmic value of distance traveled, means controlled by both of said movement producing means for indicating the average rate of travel, additional indicating means, and means controlled by both of said movement producing means for operating said additional indicating means to one indicating position after a predetermined minimum time interval has elapsed and a predetermined minimum distance has been traveled and for moving said additional indicating means to a second indicating position when a predetermined maximum time interval has elapsed or a predetermined maximum distance has been traveled.

8. An average speed indicator comprising a frame, a pair of cylinders rotatably mounted on the frame, each of said cylinders having a spiral logarithmic cam track formed therein opposite in direction to the track in the other cylinder, means for rotating a first one of the cylinders in response to the distance traveled, a clock mechanism geared to the second cylinder to rotate the second cylinder at a predetermined speed, means engaging both of the cam tracks for indicating the difference in the amount of rotation of both of the cylinders as an indication of average speed, an additional indicating device, and means controlled by said cam track engaging means for operating said additional indicating device to indicate a predetermined minimum rotation of each of said cylinders.

9. An average speed indicator comprising a frame, a pair of logarithmic cams rotatably mounted on said frame, a pair of control elements movably mounted on the frame and controlled by the cams, a first gear train for moving a first of the pair of cams in response to a first condition, a second gear train for moving a second of the pair of cams in response to a second condition, means controlled by both of the control elements for indicating the difference in movement therebetween produced by the movement of the cams, and differential gear means in engagement with both of the gear trains for returning both of the control elements to their normal position prior to movement.

10. A speed averaging unit comprising a pair of logarithmic cam means, means for moving a first of the cam means in accordance with a first condition, means for moving a second of the cam means in accordance with a second condition, a pair of movable cam follower carriages in engagement with the cam means for actuation thereby, differential means controlled by the carriages for indicating the difference in the movements of the two cam means, a pair of movable elements controlled by the carriages, and means controlled by the elements to indicate the completion of a predetermined movement by each of the cam means.

11. A speed averaging unit comprising a pair of logarithmic cam means, means for moving a first of the cam means in accordance with a first condition, means for moving a second of the cam means in accordance with a second condition, a pair of movable cam follower carriages in engagement with the cam means for actuation thereby, differential means controlled by the carriages for indicating the difference in the movements of the two cam means, a pair of movable elements controlled by the carriages, and means controlled by the elements for indicating the completion of either of two predetermined movements by the cam means.

References Cited in the file of this patent

UNITED STATES PATENTS

| | | |
|---|---|---|
| 1,056,578 | Poole | Mar. 18, 1913 |
| 1,889,876 | Pellerin et al. | Dec. 6, 1932 |
| 2,243,100 | Kennedy | May 27, 1941 |
| 2,481,555 | Wodal et al. | Sept. 13, 1949 |

FOREIGN PATENTS

| | | |
|---|---|---|
| 649,148 | France | July 8, 1927 |
| 301,314 | Great Britain | Oct. 3, 1929 |
| 195,485 | Switzerland | May 2, 1938 |